May 17, 1960   A. H. MYERS   2,936,688
PHOTOGRAPHIC REFLEX CAMERA
Filed Aug. 3, 1956   2 Sheets-Sheet 1
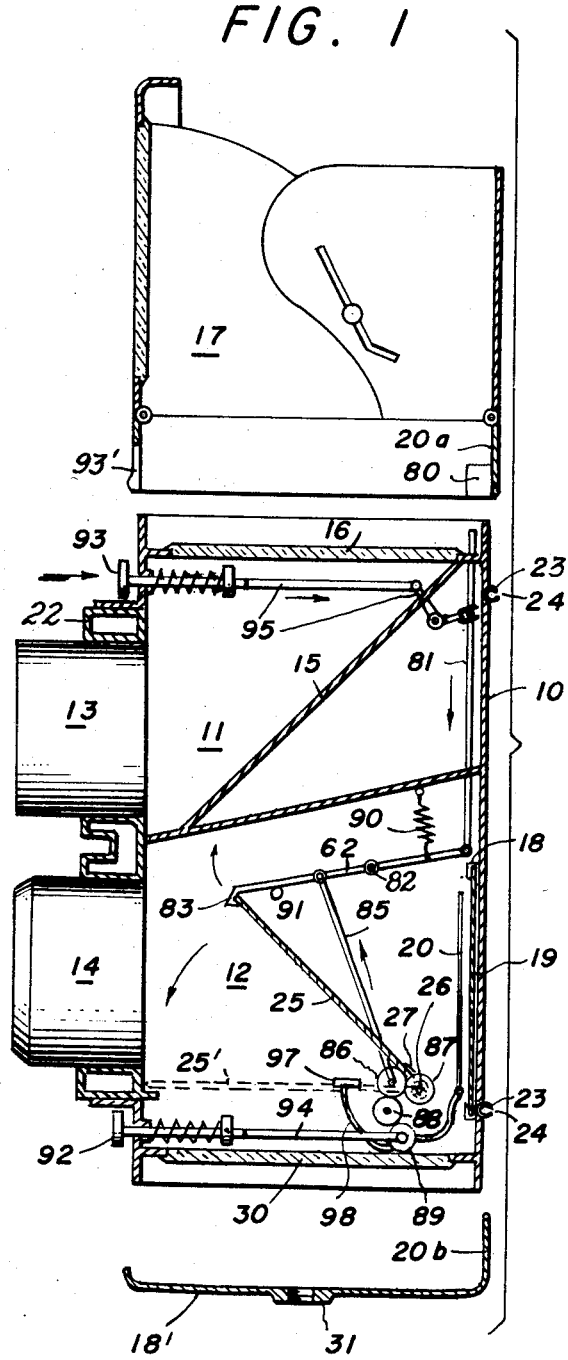
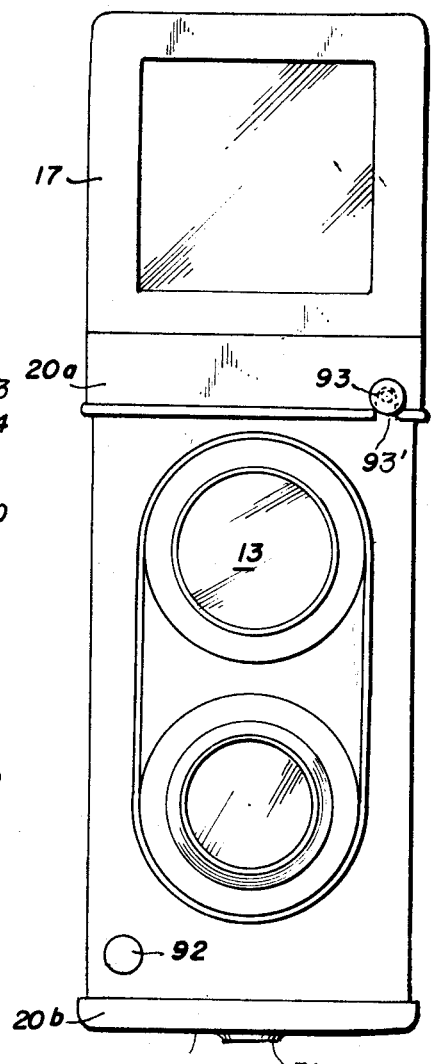
INVENTOR
ALFRED H. MYERS
BY
PATENT AGENT

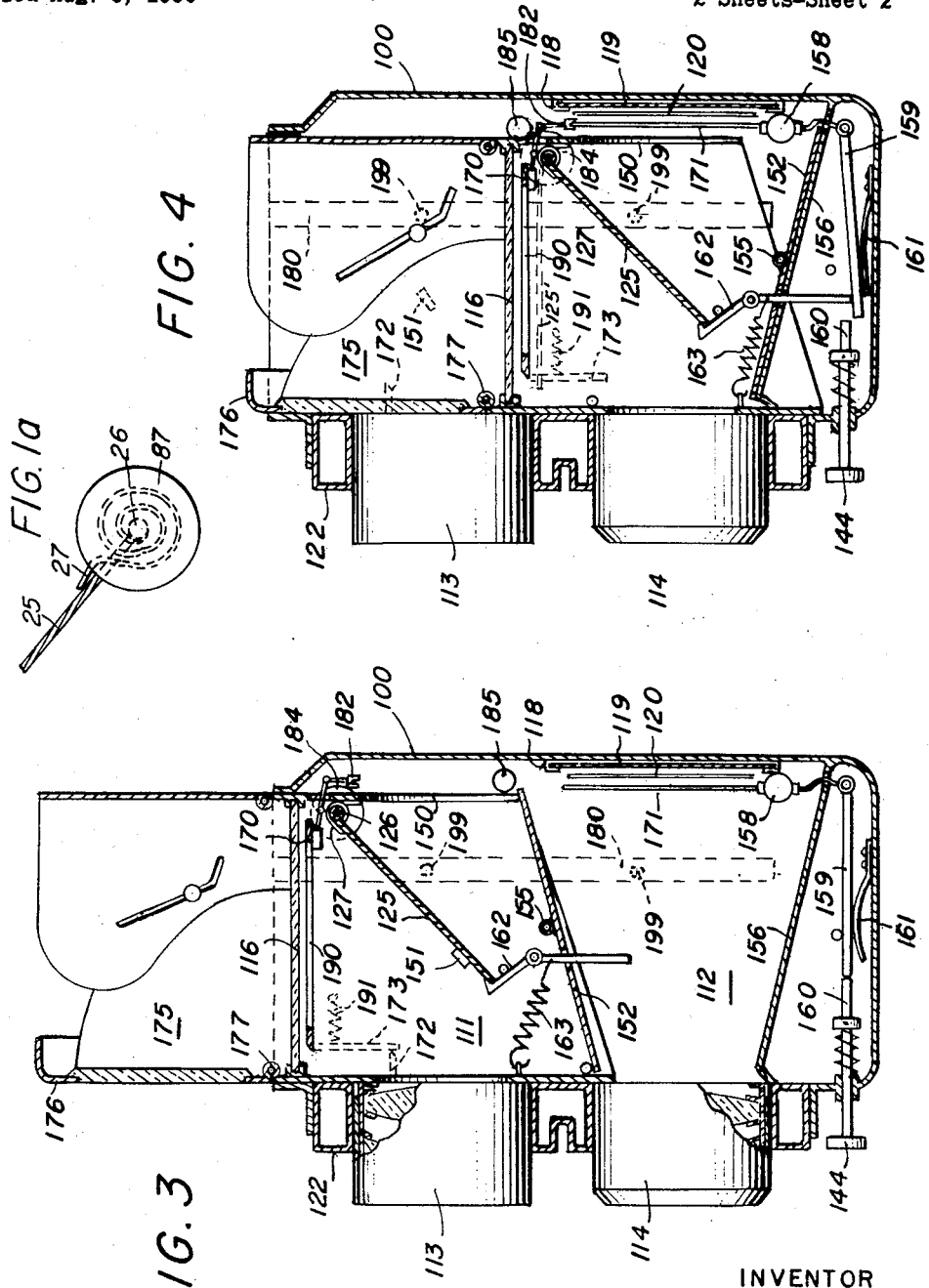

United States Patent Office 2,936,688
Patented May 17, 1960

2,936,688

PHOTOGRAPHIC REFLEX CAMERA

Alfred H. Myers, Chevy Chase, Md.

Application August 3, 1956, Serial No. 601,905

15 Claims. (Cl. 95—42)

The present invention relates to a reflex camera which is readily convertible from a single-lens reflex camera to a twin-lens reflex camera and vice versa. Thus, the disadvantages or limitations of either camera type can be avoided and full use can be made of their respective potentialities and advantages by properly selecting the particular camera type desired to take pictures either as a single-lens apparatus or as a twin-lens apparatus, according to the needs of existing photographic conditions.

As a result of the special advantages and potentialities of each, an amateur or professional photographer, having only one type of the aforementioned reflex cameras, is seriously limited with regard to his photographic work. The relatively high costs of good reflex cameras has heretofore prevented many amateurs and professionals from acquiring both a single-lens and a twin-lens reflex camera to accomplish the specialized work each is capable of performing. Furthermore, if a professional or amateur photographer possesses both kinds of reflex cameras, it means that, on trips, etc., he has to carry around two complete sets of cameras, together with all their separate, supplementary accessories as well, which is often inconvenient and burdensome.

These disadvantages are overcome according to the present invention by providing a combined single- and twin-lens camera which can be selectively used either in the manner of a single-lens reflex camera or of a twin-lens reflex camera. Thus, the limitations of the two types of cameras can be easily avoided by changing the camera from the one type to the other, whenever the conditions warrant such conversion.

It is a primary object of the present invention to provide in such combined reflex camera a housing with viewing screen means, a viewing chamber with a viewing and/or focussing lens and a picture-taking chamber with a picture-taking lens in a manner known per se in twin-lens reflex cameras and, in addition, to provide means by which the picture-taking chamber can be selectively converted so that it can also be used as viewing chamber.

It is to be understood that the viewing screen means, as referred to in this specification and claims, may serve two functions, i.e., viewing as well as focussing of the picture to be taken.

It is a further object of the present invention to equip the picture-taking chamber of this camera with an auxiliary viewing screen and an additional image reflecting mirror in a manner known per se in single-lens reflex cameras and to provide a conversion mechanism which is adapted to render the camera operative either as a twin-lens camera, whereby the viewing screen of the viewing chamber is used, or, alternatively, as a single-lens camera, whereby the auxiliary viewing screen is used in place of the first-mentioned viewing screen.

Another object of the present invention is to provide as conversion means a displaceable mechanism operatively associated with the camera housing, whereby this displaceable mechanism can be selectively placed in two positions. In the one position of the displaceable mechanism, which is the single-lens camera type position, a reflecting image mirror of the viewing system inside the camera housing is between the picture-taking lens and a light-sensitive element to be exposed and the viewing screen is thereabove, while, in the other or twin-lens camera type position, this reflecting image mirror is behind the viewing lens and the viewing screen is thereabove.

It is a further and important object of this invention to provide a frame structure displaceably mounted in the camera housing, whereby this frame structure supports the conventional diagonally disposed reflecting image mirror and the usual viewing and/or focussing screen which is mounted on the top of the frame structure. The frame structure can be selectively shifted from one position between the picture-taking lens and the light-sensitive element or film, in which position the camera can be used as single-lens camera, to another position behind the viewing or focussing lens, in which position the camera can be used as twin-lens camera.

It is a still further object of the invention to provide means for displacing the diagonal image mirror so as to clear the chamber in the frame structure before the instant of picture taking when in the single-lens position and to disconnect this displacing means when the frame structure is in the twin-lens position in which the diagonal image mirror remains fixed, i.e., immovable.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

Figure 1 is a sectional, exploded view of one embodiment of the camera according to the invention;

Figure 1a is a fragmentary view, on an enlarged scale, of a detail in the picture-taking chamber of the camera shown in Figure 1.

Figure 2 is a front view of the camera shown in Figure 1;

Figures 3 and 4 illustrate longitudinal sections of another embodiment of the camera according to the invention in its two operative positions.

Referring more particularly to the drawings, Figures 1 and 2 show a first embodiment of the invention in which the camera comprises a housing 10 containing two chambers, i.e., a picture-viewing chamber 11 and a picture-taking chamber 12, in a manner principally known in twin-lens reflex cameras. A picture-viewing lens 13 is mounted on a lens standard 22 and aligned with the picture-viewing chamber 11, while a picture-taking lens 14 is similarly secured and aligned with the picture-taking chamber 12. The lens standard 22 with the two lenses 13 and 14 can be displaced with respect to the housing 10 for focussing. A reflecting image mirror 15 diagonally disposed is stationarily mounted within this picture-viewing chamber 11 opposite the picture-viewing lens 13. The picture-viewing chamber 11 is open at the top and this opening is covered by a viewing screen 16 which may be of ground glass, or other suitable material. A foldable viewing hood 17, which may be of conventional design, is attachable to the top of the camera housing 10 above the viewing screen 16, so as to facilitate the viewing of the picture appearing on this viewing screen.

The picture-taking chamber 12 contains holding means 18 for a light-sensitive element, such as a film strip 19, or any other kind of light-sensitive material. In front of this light-sensitive element or film 19 there is provided also within the picture-taking chamber 12 a curtain 20 forming part of a focal plane curtain shutter to be opened and closed when the light-sensitive element or film 19 is to be exposed. This light-sensitive element or film 19 and the curtain 20 are directly opposite the picture-taking lens 14 within the picture-taking chamber 12. The mechanisms of the camera for handling the film and controlling the shutter may be of conventional design and are not shown in Figures 1 and 2.

While the parts of the camera, as described hereinbefore, are conventional in twin-reflex cameras, the camera according to the present invention is provided with a second reflecting image mirror 25 tiltably mounted in the picture-taking chamber 12. This mirror 25 is hinged by means of a pivot pin 26, the ends of which are journalled in the walls of the picture-taking chamber 12. This mirror 25 is biased by a spring 27 (see: Fig. 1a) tending to swing or turn the mirror 25 out of the way in the picture-taking chamber 12, as is necessary when the new camera is used as twin-lens reflex camera, i.e., when the tiltable reflecting image mirror 25 is not used. The mirror 25 is then held under the action of the spring 27 in the lower or out-of-the-way position, shown in Figure 1 at 25', and the picture is viewed by means of the fixed mirror 15 on the viewing screen 16.

If the camera is to be used as single-lens reflex camera, the reflecting image mirror 25 has to be turned or swung to the diagonal or tilted position for viewing and/or focussing of the picture. The mirror 25 may be turned to this position manually by means of a handle or knob, not shown, which might be the same as that used to cock the shutter and/or advance the film strip prior to the taking of a picture, in a manner known per se, in single-lens reflex cameras. Such mechanism is described, for example, in U.S. Patent No. 2,552,275. Thus, by transporting the film and cocking the shutter, the mirror 25 may be simultaneously brought to the tilted position shown in Figure 1. In single-lens condition of the camera, the picture is viewed and/or focussed by means of the mirror 25 on a second viewing screen 30 which, in Figure 1, is on the bottom of the housing 10, i.e., directly opposite the first viewing screen 16. The camera may be turned 180° from the position shown in Figures 1 and 2, so that the viewing screen 30 is then facing upwardly.

When the camera is to be used as twin-lens reflex camera, the viewing screen 30 in the picture-taking chamber 12 must be closed light-tight by the mirror 25 which, for this purpose, is turned to its lower or out-of-the-way position. The mirror is swung to this position either by manually turning a special knob or handle, as that mentioned in the foregoing, or automatically, when the camera is converted to twin-lens use with the aid of a mechanism which will be described hereinafter.

Viewing hoods, for example, of the conventional foldable type, may be mounted on the camera housing at the two viewing screens 16 and 30. The mechanism for converting the camera from single-lens to twin-lens use may be controlled by the folding movements of these viewing hoods in such a manner that, when the hood on the viewing screen 16 is opened, the camera is converted to twin-lens use while, when the hood on the viewing screen 30 is opened, the camera is converted to single-lens use.

The drawings show a single, foldable hood 17 which can be attached to the camera housing 10 either at the place of the viewing screen 16 or at the place of the viewing screen 30. A plain cover or lid 18' can be placed over the viewing screen 16 or 30 on which the hood 17 is not assembled. This cover or lid 18' has a threaded bushing 31 for mounting the camera on a tripod. The hood 17 and the cover or lid 18' have flanges 20a and 20b, respectively, with which they can grip over the edges at the ends of the camera housing 10, so as to be firmly secured thereto. Hinge means 23 are provided at the camera housing 10 at the top and the bottom for securing and swinging the hood 17 and the cover or lid 18' to a position where they can be removed from the camera housing 10. For this purpose, these hinge means 23 are provided with slots 24 so as to permit the hood 17 and the cover or lid 18' to be completely detached from the camera housing 10. Locking means may be provided on the hood 17 or cover 18' at the opposite side of the hinges 23 to assure a firm mounting of these parts on the camera housing.

When the hood 17 is assembled on the housing 10 at the viewing screen 16, the camera is converted for use as twin-lens reflex camera. For this purpose, a protrusion 80 on the inner wall of the flange 20a of the hood 17 is provided to engage a cutout in the upper edge of the housing 10 at a corresponding location. This protrusion 80 is adapted to engage the free end of a rod 81 in the camera housing 10 moving it downwardly and thereby acting on one end of a double lever 62 pivotally mounted at 82 in the housing 10. The other end of this double lever 62 forms a hook or catch 83 for the mirror 25 which is under action of the spring 27 (see Fig. 1a) urging the mirror 25 to the lower or out-of-the-way position. Thus, the downward movement of the rod 81 causes the catch or hook 83 to release the mirror 25 which will then swing to its lower position indicated in dotted lines at 25'. At the same time, a bar 85 linked to the double lever 62 and carrying at its lower forked end a friction wheel 86 is also moved upwardly, whereby the friction wheel disengages from wheels 87 and 88 which were operatively connected by this wheel prior to its downward movement. The wheel 87 is secured to the pin or shaft 26 of the mirror 25 while the wheel 88 is operatively connected to a shutter cocking and releasing mechanism 89 which may be combined with a film transporting mechanism similar to that described in U.S. Patent No. 2,552,-275. The mechanism 89 is diagrammatically indicated as are the elements for the automatic control, so as not to crowd the drawings. These elements and parts are on one side of the interior of the camera and out-of-the-way of the picture-viewing and picture-taking chambers. When the hood 17 is removed from the housing 10, the rod 81 is released, as the protrusion 80 is lifted from the free end of this rod 81, and the double lever 62 is returned to its rest position by a spring 90, in which position it engages a stop 91 attached to the inner wall of the housing 10. The same spring 90 also tends to return the wheel 86 to its original or engaged position.

Thus, it will be evident that the conversion of the camera from twin-lens use to single-lens use and vice versa can be accomplished by placing the hood 17 on the housing 10 at the viewing screen 16 or removing it therefrom.

The camera has two release buttons 92 and 93 diagonally opposite one another on the front wall of the housing 10. The lower button 92 is at the left corner of the front wall, as shown in Figure 2. This button 92 is to be used in twin-lens condition of the camera when the hood 17 is attached to the housing 10 at the viewing screen 16. The free or inner end of the pin of this button 92 engages, when the button is depressed, a rod 94 which is operatively connected to the shutter releasing mechanism 89 so that the shutter 20 will be instantaneously opened and closed to expose the film 19. At the same time, the upper button 93 is rendered immovable, i.e., locked by a part of the hood flange 20a which is lodged between the button 93 and the wall of the housing 10 at its upper edge. A narrow slot 93' is provided in the flange 20a at the location of the button 93 so that the flange can be placed on the housing 10 and clear the thin pin of this button 93. Thus, the button 93 cannot be moved when the camera is in condition for twin-lens use.

When the hood 17 is placed on the housing 10 at the other viewing screen 30 and the cover 18' is secured to the housing at the first viewing screen 16, the camera is ready to be used as single-lens apparatus. The opposite release button 92 is then rendered inoperative by the hood flange 20a and the release button 93 is to be in normal position after the camera has been turned 180°. Inside the camera, the inner or free end of the pin of the button 93, when depressed, engages a rod 95 which is operatively connected to the double lever 62 via a lever system 95 and the bar 81, so that the mirror 25 is released which was previously turned to the tilted position necessary for viewing and focussing of the picture on the viewing screen 30. The mechanism for swinging the mirror 25 to this tilted position, either together with or separate from shutter cocking and film transporting operations, has been mentioned in the foregoing. A side edge of the mirror 25, turning under action of the spring 27 to the lower position indicated at 25', engages, shortly before the mirror comes to rest, a release stop 97 operatively connected to the shutter releasing mechanism 89 via a rod 98 to release the shutter 20 which will then open and close. At the very end of the movement of the mirror 25, the latter has passed the release stop 97, so that it will no longer act on the shutter releasing mechanism 89. The release of the shutter 20 in this kind of operation results in a time delay necessary for the clearing of the picture-chamber 12 by the mirror 25. Other time delay means may be used in place of the one described.

A portion of the flange 20b of the cover 18' is cutout at the front, so that it will not interfere with the operation of either of the release buttons 92 or 93. Nevertheless, the cover 18' can be firmly secured to the camera housing 10 in either position, particularly, if the locking device, mentioned hereinbefore, will be provided at the front.

As shown in Figure 1, a cutout or slot is provided at the lower edge of the housing 10 to receive the protrusion 80 on the inner wall of the hood flange 20a when the hood 17 is placed on the screen 30.

The camera shown in Figures 1 and 2 may be equipped with conventional parallax compensating means which is desirable for twin-lens use of this apparatus.

A second embodiment of this invention is illustrated in Figures 3 and 4, in which a housing 100 displaceably supports a lens standard 122 with a picture-viewing lens 113 and a picture-taking lens 114. A slidable frame or frame structure 150 is mounted in the housing 100 to be vertically displaced therein so as to convert the camera from a twin-lens reflex camera to a single-lens reflex camera. This frame structure 150 contains a reflecting image mirror 125 hingedly mounted at 126 and, as upper wall, a substantially horizontally arranged viewing screen 116.

When the frame structure 150 is in the upper or twin-lens position of the camera, as shown in Figure 3, the reflecting image mirror 125 is diagonally tilted and disposed opposite the picture-viewing lens 113 so that it reflects the picture to be viewed and/or focussed upon the viewing screen 116. This reflecting image mirror 125 is biased by a spring 127 to swing upwardly for use in the single-lens position, described in the following. When the frame structure 150 is moved to the upward position, shown in Figure 3, the mirror 125 engages an abutment 151 on at least one of the side walls inside the camera housing 100, so that this mirror 125 is arrested and held fixed in the aforementioned diagonal position. The bottom of the frame structure 150 comprises an inclined partition or wall 152 which, according to Figure 3, closes up the picture-taking chamber 112 below the frame structure 150, sealing it light-tight, as required for the operation of a twin-lens reflex camera. This picture-taking chamber 112, close to the wall opposite the picture-taking lens 114, contains a holding and/or supporting member 118 for a light-sensitive element, such as a film strip 119, which may be wound from a film roll and wound up on another film roll, not shown, in a manner known per se. A curtain 120 of a focal plane curtain shutter covers the film strip 119 and uncovers it only during the exposure when the picture is taken. This shutter can be released by actuation of a releasing button 144, an operation which will be described hereinafter.

If it is desired to convert the camera into a single-lens reflex camera, the frame structure 150 with the viewing screen 116 and the reflecting image mirror 125 are lowered, as shown in Figure 4, so as to be within the picture-taking chamber 112. The reflecting image mirror 125 then disengages from the abutment 151 and swings up under the action of the spring 127 whereby the mirror 125 assumes its released position, indicated in dotted lines at 125' in Figure 4, in the converted single-lens reflex camera. In this condition of the camera, the reflecting image mirror 125 seals the viewing screen 116 light-tight from below.

A bottom 152 of the frame structure 150 is pivotally mounted at 155 in the side walls of the frame structure 150 and assumes, as shown in Figure 4, a slanting position, due to engagement with an abutment or partition 156 which, likewise, is inclined and is secured to the inner walls in the lower part of the housing 100. When the frame structure 150 is in the upper position, see Figure 3, of the frame structure 150, the bottom 152 is tilted to an oppositely slanting position. These inclined positions of this bottom 152 are desirable to prevent socalled internal reflections which are disturbing, particularly, with the use of fast films. In addition, the provision of the tiltable bottom 152 results in a more compact structure of the two chambers and, thereby, reduces the extent of parallax.

When the frame structure 150 is in the upper or twin-lens position of the camera, see Figure 3, the two chambers, i.e., the picture-viewing chamber 111 and the picture-taking chamber 112 are separated from one another in a light-tight manner. By depressing a releasing button 144, disposed at the lower edge on the outside of the camera housing 100, a shutter releasing mechanism, known per se and schematically indicated at 158, is actuated via a rod 159 inside the housing 100, said rod being engaged by the inner end of a pin 160 of the releasing button 144 when the same is depressed. It is to be noted that the rod 159 is supported by the free end of a leaf spring 161, the opposite end of which is mounted on the inner bottom wall of the housing 100. When the frame structure 150 is in the lower or single-lens position of the camera, see Figure 4, the free or lower end of a double arm lever 162, pivotally mounted in the frame structure 150 and biased by a spring 163, pushes down the rod 159 overcoming the force of the leaf spring 161 which, in Figure 3, held the rod 159 in a position in which it was aligned with the inner end of the pin 160 of the push-button 144. While the double lever 162 pushes down the rod 159, it takes a position in front of the inner end of the push-button pin 160 so that when the latter is now depressed, the double lever 162 will be turned so as to release the mirror 125 from its diagonal position. The mirror 125 will then flip up and cover the viewing screen 116, as is necessary to seal the picture-taking chamber light-tight during the exposure of the film. The actual release of the shutter is accomplished in this single-lens position (Figure 4) by the mirror 125 when it flips up and, thereby, hits a release stop 170 which is linked also to the releasing mechanism 158 of the shutter via a rod 171. This is necessary because the shutter cannot be released before the reflecting image mirror 125 has cleared the picture-taking chamber and sealed the viewing screen 116 by covering it from below. The release stop 170 is engaged by the side of the mirror 125 shortly before it comes to rest and is then disengaged, so that the stop 170 will not remain engaged by the mirror when at rest in the upper position.

If the camera is reconverted into a twin-lens reflex camera (Figure 3), the control of the shutter releasing mechanism is restored to its previous condition in which it is directly operable by the push-button 144 with the aid of the rod 159, i.e., without providing a time delay by the time-delaying operation of the image mirror 125 as in Figure 4. In place of the time-delay mechanism described, any other kind of time-delay mechanism may be used. In such case, of course, similar means have to be provided to disconnect or exclude the time-delay mechanism when the frame structure is in the upper or twin-lens position (Figure 3), where time delay is not desirable.

When the camera is used as twin-lens reflex camera (Figure 3), a parallax-compensating means is desirable to assure proper viewing of the picture to be taken on the viewing screen 116. For this purpose, a masking frame 190 is provided underneath the viewing screen 116, this frame variably masking two opposite edges of the screen 116 when the lenses of the camera are displaced for focussing. Such parallax-compensating means have been known in twin-lens reflex cameras and are not part of this invention. The parallax-compensating frame 190, as shown in Figure 3, is operatively connected to the lens standard 122 by means of a known motion translating device (not shown), which also reverses the direction of movement. A lug 172 of this device is adapted to engage an arm 173 integral with the masking frame 190, see Figure 3. When the frame structure is moved to the lower or single-lens position illustrated in Figure 4, the lens standard 122 is disconnected from the parallax-compensating frame as the lug 172 is disengaged from the arm 172 since, in this position, no parallax-compensation is needed. In Figure 4, the disconnected parallax-compensating frame 190 assumes the extreme left position under action of a biasing spring 191 and the frame 190 remains stationary while the camera is used as single-lens reflex camera since no parallax problems are then present.

A viewing hood 175, which may be of the usual foldable type, is on top of the viewing screen 116. This hood 175 has a cover 176 hingedly connected to the top of the frame structure 150 at 177. The hood 175 can be opened and closed in a conventional manner. If the camera is to be converted from the twin-lens condition (Figure 3) to the single-lens condition (Figure 4), the hood 175 must be first opened, whereupon the frame structure 150 can be lowered into the camera housing 100. The hood 175 then enters the housing and the hood cover 176, which is in a substantially vertical position, will be disposed behind the picture-viewing lens 113 in the upper part of the housing 100. In this manner, stray light is prevented from entering the camera housing 100 and interfering with the viewing and/or focussing of the picture when the picture-taking chamber is used for this purpose, as usual in single-lens reflex cameras. The frame structure 150 is displaced in the camera housing 100 by gripping the end of the cover 176 of the hood 175 when opened and moving it up or down. Vertical channels 180 are provided at and along the inner surfaces of the walls of the camera housing 100 to be engaged by correspondingly located ribs or rails (not shown) on the sides of the frame structure 150 to assure proper alignment of this frame structure inside the housing 100 in the two operative positions. Spring-pressed balls 199 are adapted to lock the frame structure in the housing 100 at the two operative positions. Flexible or resilient means are provided between the frame structure 150 and the inner wall of the camera housing at at least two locations, so as to seal the picture-taking chamber light-tight in the two operative positions. These light-sealing means and other sealing means to be provided, for example, at the passage of the double-lever 162 through the bottom 152, are not shown in Figures 3 and 4 to avoid crowding of these illustrations.

The rod 171, connecting the release stop 170 with the shutter releasing mechanism 158, is provided with a coupling at 182, permitting a separation of this rod link when the frame structure 150 is moved to the upper or twin-lens position, see Figure 3, in which the shutter mechanism 158 is released directly upon actuation of the release button 144, rather than indirectly, i.e., with time delay, after the mirror 125 has moved upwardly, as in case of the operation of the camera as single-lens apparatus (Figure 4). The coupling at 182 is a simple sleeve-connecting means, the separated members of which engage one another when the frame structure 150 is lowered (Figure 4).

When the camera is used as single-lens reflex apparatus with the frame structure 150 in the position shown in Figure 4, the mirror 125 has to be tilted in order to view and/or focus the picture to be taken on the viewing screen 116. The mirror 125 may be turned to this position manually by means of a simple knob or handle accessible at the outside of the housing 100 and being operatively connected with the mirror shaft or pin 126. However, in the embodiment shown in Figure 4, a different mechanism is provided to swing the mirror 125 to the tilted position. The pin or shaft 126 carries at one side of the mirror 125 a gear or friction wheel 184 which engages a gear or wheel 185 operatively connected with a shutter cocking mechanism which is suitably combined with the shutter releasing mechanism at 158. These mechanisms may be further combined with the film transport mechanism in a manner known per se and described, for example, in U.S. Patent No. 2,552,275. Thus, by a single operation of the combined mechanisms, the film is advanced, the shutter cocked and simultaneously, the mirror 125 is swung to the tilted position by means of the engaged gears or wheels 184 and 185. When the frame structure 150 is moved upwardly, see Figure 3, the gear or wheel 184, moving also upwardly, disengages from the gear or wheel 185 connected to the shutter cocking mechanism, so that the mirror 125 becomes independent of this mechanism, as required in twin-lens use of the camera.

The members of the various control mechanisms are diagrammatically illustrated and auxiliary elements, such as guiding means to be associated therewith, have been omitted to avoid crowding of the drawings.

In the embodiments shown and described, it is assumed that the rolls for the film strips and also the rolling mechanism for the focal plane curtain shutter are arranged laterally with respect to the camera housings in a manner known per se, however, any other arrangement and/or construction for the support, guidance and handling of the light-sensitive element of any kind may be provided. For example, the film rolls may be in cartridges or in magazines to be placed in the camera housings, or detachable film magazines may be used in a manner known heretofore.

While in the embodiments of the new reflex camera, shown and described in the foregoing, focal plane curtain shutters are used, any other kind of shutters, such as lens shutters, may be employed. In the latter case, means should be provided by which the film is covered during viewing or focussing. This can be accomplished by means of a shield which may be part of the reflecting mirror assembly. This shield is automatically controlled, in a manner known per se, so that it will uncover the film after the viewing screen has been closed light-tight, whereupon the shutter can be released.

I claim:

1. A photographic twin-lens reflex camera comprising, in combination: a housing having a picture-taking chamber and a viewing chamber; a picture-taking lens and a viewing lens in said chambers, respectively; at least one image reflecting mirror means and at least one viewing screen means in said housing, said mirror means being displaceable in said picture-taking chamber between a diagonal viewing position and another position in which said mirror is clear of said chamber; holding means for a light-sensitive element in said picture-taking chamber; a shutter mechanism in front of said light-sensitive element; a shutter releasing means operatively connected to said shutter mechanism; and hood means associated with said picture-taking chamber for selectively converting it so that it can be used as a viewing chamber as in a single-lens reflex type camera, said conversion means including a viewing hood movable between a first operative position in which it cooperates with said viewing chamber and a second operative position in which it cooperates with said picture-taking chamber, said conversion means further including a mirror actuating mechanism operable in response to movement of said hood from one operative position thereof to the other for moving said mirror from one of its positions to the other, said mirror actuating mechanism being so connected to said mirror that said mirror is in said clear position when said hood is in its first operative position and that said mirror is in said diagonal viewing position when said hood is in its second operative position, whereby said camera may be converted from a twin-lens reflex camera to a single-lens reflex camera, and vice versa.

2. A twin-lens reflex camera according to claim 1 wherein said mechanism comprises displaceable means operatively associated with said housing and supporting said reflecting image mirror and said screen means; said displaceable means being adapted to be selectively placed in a first position in which said reflecting image mirror means is behind said viewing lens and in which said viewing screen means is thereabove, whereby said camera can be used as twin-lens reflex camera, and in a second position in which said reflecting image mirror means is between said picture-taking lens and said light-sensitive sheet and in which said viewing screen means is thereabove, whereby said camera can be used as single-lens reflex camera.

3. A photographic reflex camera according to claim 1 wherein said housing has an opening at its top, wherein said mirror actuating mechanism comprises a frame structure, wherein said viewing screen is at the top of said frame structure, and wherein said frame structure is displaceable from a first position in which said camera is used as a twin-lens camera and in which said frame structure is behind said viewing lens to a second position in which said camera can be used as a single-lens reflex camera and in which said frame structure is between said picture-taking lens and said light-sensitive element.

4. A photographic reflex camera according to claim 3, said reflecting image mirror being displaceably mounted in said frame structure; a release button for said shutter releasing mechanism outside said housing; a mechanism operative in said second position of said frame structure upon operation of said release button to turn said mirror from its diagonal position to a position in which said mirror clears the chamber between said picture-taking lens and said light-sensitive element and covers said viewing screen light-tight; means in said frame structure to render said mirror-turning mechanism ineffective and to hold said mirror in a diagonal position when said frame structure is in said first position; selector means between said release button, said turning mechanism and said shutter-releasing mechanism to select the release operation of said release button so that, in said first position of said frame structure, said release button is solely and directly operable on said shutter-releasing mechanism so as to instantaneously release said shutter means upon actuation of said release button while, in the second position of said frame structure, said release button is operable on said mirror turning mechanism to act after clearing said picture-taking chamber on said shutter-releasing mechanism so that, upon actuation of said release button, said mirror is first turned to clear the picture-taking chamber and cover said viewing screen light-tight, whereby the action of said shutter-releasing mechanism on said shutter means is delayed until the clearing movement of the mirror is completed.

5. A photographic reflex camera according to claim 4, said selector means being operatively associated with said frame structure so that the respective changes in the operative conditions of said button are accomplished when said frame structure is displaced from one to the other of said two positions.

6. A photographic reflex camera according to claim 3, wherein a parallax compensating means is associated with said viewing screen, a mechanism operatively connecting said compensating means with one of said lenses and means to render said compensating means ineffective in said second position of said frame structure.

7. A photographic reflex camera according to claim 3, wherein said frame structure has a lower wall pivotally mounted therein and wherein said housing has in its interior abutment means to be respectively engaged by said lower wall in the two operative positions of said frame structure so that said lower wall will take oppositely inclined positions when said frame structure is in the one or the other of said operative positions so as to restrict the effective space in said picture-taking chamber and thereby to reduce internal reflection.

8. A photographic reflex camera according to claim 7, wherein the lower of said abutment means constitutes a fixed, inclined wall at the bottom of said housing, said wall serving as lower space-restricting means for the picture-taking chamber when said frame structure is in its second position.

9. A photographic reflex camera according to claim 3, resilient sealing means between said housing and said frame structure at said two operative positions thereof to seal the chamber behind the picture-taking lens light-tight in each of said two positions of said frame structure.

10. A photographic reflex camera, comprising a housing having separate picture-viewing and picture-taking chambers; a picture-viewing lens and a picture-taking lens in said chambers, respectively; a fixed, diagonally disposed reflecting image mirror and a first viewing screen in said picture-viewing chamber; a tiltable reflecting image mirror and a second viewing screen in said picture-taking chamber; means to swing said tiltable mirror from a diagonal position to a position in which it clears said picture-taking chamber and covers said second viewing screen light-tight; holding means for a light-sensitive element opposite said picture-taking lens in said picture-taking chamber; a shutter in front of said light-sensitive element; shutter cocking and releasing mechanisms operatively connected to said shutter; a first release button on said housing; means to retain said tiltable mirror in the diagonal position; means to operatively connect said button to said retaining means to render it inoperative upon depressing of said button so as to release said tiltable mirror so that it can be acted upon by said mirror swinging means turning said mirror to the position in which it clears said picture-taking chamber and covers said second viewing screen light-tight, whereby said tiltable mirror acts on said shutter releasing mechanism and trips said shutter to open and close; a second release button on said housing, means to operatively connect said second button to said shutter releasing mechanism to trip upon depressing of said second button said shutter to open and close while said tiltable mirror is held under the action of said swinging means in the position in which it clears said picture-taking chamber and covers said second viewing screen light-tight.

11. A photographic reflex camera according to claim 10, wherein means are provided to connect said shutter-cocking mechanism to and disconnect it from said mirror swinging means, and displaceable cover means to be selectively attached to said viewing screens according to the selected use of the camera as a single-lens or as a twin-lens reflex camera; means on said cover means to lock that one of the said two release buttons which is not to be used, said connecting and disconnecting means of said mirror swinging means being operatively engaged by one of said cover means, when it closes said first viewing screen, to disconnect said mirror swinging means.

12. A photographic reflex camera according to claim 11, said two release buttons being mounted close to the edges of said housing where said displaceable cover means are attached, said cover means having flanges gripping over and engaging said edges, said flanges being formed with cutouts to receive said release buttons, portions of said flanges at said cutouts being adapted and arranged to interfere with the depressing operation of one of said buttons to render it immovable.

13. A photographic reflex camera according to claim 11, wherein said displaceable cover means are separable from said housing and wherein hinge means are provided to secure said displaceable cover means on said housing at said viewing screens.

14. A photographic reflex camera according to claim 11, wherein at least one of said cover means is a foldable viewing hood which can be attached to said housing at either of said viewing screens.

15. A photographic reflex camera according to claim 11, one of said cover means being a lid having a threaded part adapted to be detachably connected to a tripod.

References Cited in the file of this patent

UNITED STATES PATENTS

| | | |
|---|---|---|
| 738,066 | Reichenbach | Sept. 1, 1903 |

FOREIGN PATENTS

| | | |
|---|---|---|
| 894,412 | France | Mar. 13, 1944 |
| 885,654 | Germany | Aug. 6, 1953 |
| 906,654 | Germany | Mar. 15, 1954 |